US008463282B2

(12) United States Patent
Attar et al.

(10) Patent No.: US 8,463,282 B2
(45) Date of Patent: Jun. 11, 2013

(54) OVERLOAD DETECTION IN A WIRELESS COMMUNICATION SYSTEM

(75) Inventors: Rashid A. Attar, San Diego, CA (US); Bibhu P. Mohanty, San Diego, CA (US); Jack M. Holtzman, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1432 days.

(21) Appl. No.: 10/728,035

(22) Filed: Dec. 3, 2003

(65) Prior Publication Data

US 2005/0124369 A1 Jun. 9, 2005

(51) Int. Cl.
*H04W 72/00* (2009.01)
*H04B 7/00* (2006.01)

(52) U.S. Cl.
USPC .......................................... 455/453; 455/522

(58) Field of Classification Search
USPC ................................ 455/423, 453, 452.2, 522
See application file for complete search history.

(56) References Cited

U.S. PATENT DOCUMENTS

| 5,697,054 | A | * | 12/1997 | Andersson | 455/524 |
|---|---|---|---|---|---|
| 5,884,174 | A | * | 3/1999 | Nagarajan et al. | 455/436 |
| 5,917,806 | A | * | 6/1999 | Lin et al. | 370/237 |
| 5,949,757 | A | * | 9/1999 | Katoh et al. | 370/232 |
| 6,134,216 | A | * | 10/2000 | Gehi et al. | 370/231 |
| 6,240,287 | B1 | * | 5/2001 | Cheng et al. | 455/453 |
| 6,324,172 | B1 | | 11/2001 | Pankaj | 370/342 |
| 6,405,045 | B1 | * | 6/2002 | Choi et al. | 455/453 |
| 6,442,398 | B1 | * | 8/2002 | Padovani et al. | 455/522 |
| 6,456,850 | B1 | * | 9/2002 | Kim et al. | 455/453 |
| 6,563,810 | B1 | | 5/2003 | Corazza | 370/335 |
| 6,707,792 | B1 | * | 3/2004 | Volftsun et al. | 370/235 |
| 6,785,546 | B1 | * | 8/2004 | Djuric | 455/445 |
| 6,944,449 | B1 | * | 9/2005 | Gandhi et al. | 455/425 |
| 6,996,178 | B1 | | 2/2006 | Zhang et al. | |
| 7,346,111 | B2 | | 3/2008 | Winger et al. | |
| 7,436,891 | B2 | | 10/2008 | Taunton | |
| 2002/0155852 | A1 | * | 10/2002 | Bender | 455/522 |
| 2002/0173316 | A1 | * | 11/2002 | Jang et al. | 455/453 |
| 2003/0003921 | A1 | * | 1/2003 | Laakso | 455/453 |
| 2003/0125068 | A1 | * | 7/2003 | Lee et al. | 455/522 |
| 2004/0165529 | A1 | * | 8/2004 | Lee | 455/512 |
| 2004/0190625 | A1 | | 9/2004 | He et al. | |

(Continued)

FOREIGN PATENT DOCUMENTS

JP 2005354673 A 12/2005
WO 2006029382 A2 3/2006

OTHER PUBLICATIONS

Conversy S., et al., "The svgl toolkit: enabling fast rendering of rich 2D graphics" Technical Report-Ecole Des Mines De Nantes, No. 02/01/info, 2002, pp. 1-11, XP002539626 France.

(Continued)

*Primary Examiner* — Marisol Figueroa
(74) *Attorney, Agent, or Firm* — Kevin Cheatham

(57) ABSTRACT

A method and apparatus for overload detection and control is disclosed. A base station may be in communication with one or more subscriber stations. Overload may be detected as a function of a plurality of parameters, each of which places a load on the base station. Both the type and degree of overload may be ascertained. Appropriate remedial measures may be implemented that are suitable to the type and degree of overload detected.

45 Claims, 7 Drawing Sheets

U.S. PATENT DOCUMENTS

| | | | |
|---|---|---|---|
| 2004/0209623 A1* | 10/2004 | Sauter et al. | 455/453 |
| 2005/0169378 A1 | 8/2005 | Kim et al. | |
| 2005/0254581 A1 | 11/2005 | Iguchi et al. | |
| 2008/0025398 A1 | 1/2008 | Molloy et al. | |

OTHER PUBLICATIONS

International Preliminary Report on Patentability—PCT/US07/074627 International Search Authority, European Patent Office—10120108.

International Search Report, PCT/US2007/074627—International Search Authority, European Patent Office—Apr. 16, 2008.

"Motion compensation memory access optimization strategies for H.264/AVC decoder", Proc. of Int. Conf. on Acoustics, Speech, and Signal Processing, Mar. 15, 2005, vol. V, P.V-97~V-100.

Tsai C.Y., et al., "Bandwidth optimized motion compensation hardware design for H.264/AVC HDTV decoder", 48th Midwest Symp. On Circuits and Systems, Aug. 7, 2005, P.1199-1202.

Wiegand, T. et al.: "Overview of the H.264/AVC Video Coding Standard," IEEE Transactions on Circuits and Systems for Video Technology, vol. 13, No. 7, Jul. 2003, 19 pp, XP011099249, ISSN: 1051-8215.

Written Opinion—PCT/US07/074627 International Search Authority, European Patent Office Apr. 16, 2008.

Zhu J., et al., "High performance synchronous DRAMs controller in H.264 HDTV decoder", Proc. of 7th Int. Conf. on Solid-State and Integrated Circuits Technology, Oct. 18, 2004, pp. 1621-1624.

* cited by examiner

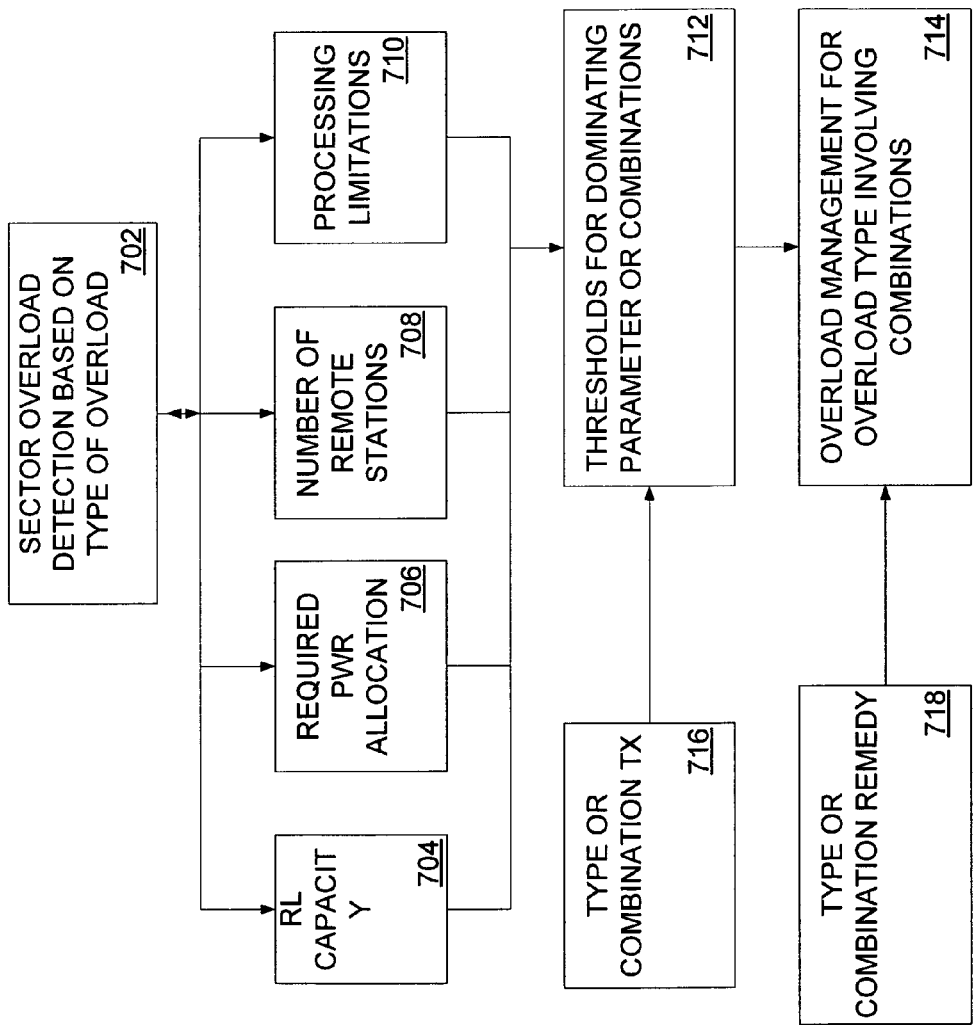

OVERLOAD DETECTION IN A WIRELESS COMMUNICATION SYSTEM

BACKGROUND

1. Field

The present invention relates to wireless communication systems, and more specifically to systems and techniques for detecting overload in a wireless communication system.

2. Background

Today, numerous different types of communication systems abound.

Wireless communication methods have gained great popularity in the past decade with the public. The appeal of wireless communications includes, among other things, the strong convenience factor of mobility. Another source of appeal is the ability to transmit data or voice communications without the need for cumbersome wiring or heavy equipment.

A number of different technologies have been pursued to implement wireless communications. These include systems based exclusively on Time Division Multiple Access (TDMA) schemes wherein the wireless communication channels between a base station and wireless communication devices (such as mobile telephones, laptop computers, handheld devices, and the like) are separated into discrete timeslots, each timeslot allowing for a particular communication device to transmit or receive data to or from the base station. Another popular system used extensively for wireless communications is based on Frequency Division Multiple Access (FDMA) techniques, where each wireless device transmits data on separate frequencies to distinguish the transmissions of one device from the other.

More recently, Code Division Multiple Access (CDMA) techniques have been introduced and are in widespread use commercially. The use of CDMA techniques in wireless communications has numerous advantages. Well-designed CDMA implementations can dramatically increase call quality, user capacity, data rates, and security, among offering other attributes. CDMA techniques are now prevalent in communication systems that employ fixed base stations within an access network to support communications with wireless communication devices. The CDMA communications system is a modulation and multiple access scheme based on spread-spectrum communications. In a typical CDMA communications system, a large number of signals share the same frequency spectrum. In accordance with CDMA techniques, several streams of information are each encoded using a unique code. It is these unique codes that allow the information to be transmitted over the same frequency band. Each information stream spread by a different code is commonly referred to as a "CDMA channel" or "code channel." The coded information modulates a carrier signal, and thereby spreads the signal over a large bandwidth. The transmitted signals can be separated in the receiver by a demodulation process using a corresponding code to de-spread the desired signal. In short, whereas TDMA and FDMA rely on time and frequency channels to differentiate signals intended for different devices, CDMA relies on code channels for differentiation. The advantages of such a system are numerous, and include increased user capacity due to the fact that a number of communication streams can be simultaneously transmitted on the same frequency. Increased security, enhanced call quality, and high data rates are among other advantages that have been realized by CDMA technology.

In any wireless communications system, problems can occur when too many wireless communication devices are attempting to communicate with the same base station. A condition can be reached whereby the base station simply cannot accommodate the number of wireless communication devices attempting to access its resources. This condition is commonly referred to as overload. Overload can occur for a variety of reasons. Typically, overload occurs when one or more parameters are pronounced enough to result in placement of a "load" on the base station that, if sufficiently large, can effectively rob the base station of resources it needs to manage the ongoing communications.

In addition, depending on the causes of overload, different degrees of overload can occur. In particular, an overload condition may be severe enough to cause the termination of most or all communications between the base station and the wireless communication devices. Conversely, an overload condition may be less severe and can have minimal influence on the system. In the latter case, a need exists for detecting an early overload condition so that appropriate remedial measures may be taken as necessary to prevent an ensuing severe overload that would otherwise cause noticeable degradations in system performance.

Whatever the reason for overload, an effective communications system should have well-designed methods in place for detecting and managing overload. For optimizing performance, it is useful to detect overload conditions at the right instance. Detecting "overload" prematurely such as in situations where actual overload does not yet exist is problematic. Premature detection may result in the system taking remedial measures such as, for example, unnecessarily eliminating users of wireless communication devices from communicating with the base station that did not need to be eliminated in the first instance. Conversely, the failure to detect overload until the condition is severe—causing a corresponding failure to trigger timely remedial measures—can result in unnecessary communication failures between wireless communications devices and the base station. These failures can result in noticeable degradation in performance of the system by users of the remote stations.

Traditional overload detection schemes are hardly sophisticated enough to address these issues, much less provide an effective solution for any of them. They rely solely on considering the number of remote stations in communication with the base station at any given time. Where that number exceeds a static threshold, overload is detected. This method is insufficient and, more often than not, is grossly unreliable. First, the declaration of overload when a number of wireless devices communicating with a base station sector exceeds an arbitrary threshold, without additional information, is not an accurate indication that an actual overload condition based on real performance-related factors exists.

Further, this traditional method does not distinguish the severity of the detected overload condition. In the traditional method, overload either exists or it does not. Use of this scheme provides no measure for detecting early signs of threshold and thereby providing appropriate remedial measures before more serious overload occurs, potentially causing significant and noticeable degradation in communications that could have been avoided from the outset by early detection. As such, the traditional method does not employ any scheme for identifying minor overload problems that could otherwise be corrected or minimized through appropriate management, thereby avoiding more severe overload.

In short, this traditional detection scheme is problematic, oversimplified, and more often than not, is not indicative of whether an actual overload condition based on real world parameters exists.

SUMMARY

In one aspect of the present invention, a method of communications includes communicating, from a base station, with a plurality of communication devices, the communications placing a load on the base station, monitoring a plurality of parameters each relating to the load on the base station, and detecting an overload as a result of one of the parameters crossing a threshold.

In another aspect of the present invention, a base station is configured to support communications with a plurality of communication devices, the communications placing a load on the base station, the base station including a processor configured to monitor a plurality of parameters each relating to the load on the base station, and to detect an overload as a result of one of the parameters crossing a threshold.

In still another aspect of the present invention, an apparatus comprises means for supporting communications with a plurality of communication devices, the communications placing a load on the base station, means for monitoring a plurality of parameters each relating to the load on the base station, and means for detecting an overload as a result of one of the parameters crossing a threshold.

It is understood that other embodiments of the present invention will become readily apparent to those skilled in the art from the following detailed description, wherein it is shown and described only several embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 7 is a flowchart illustrating a process for detecting overload based loosely on the number of subscriber stations in communication with a base station.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention will be described in the context of a CDMA communications system. While these inventive aspects may be well suited for use with this application, those skilled in the art will readily appreciate that these inventive aspects are likewise applicable for use in various other communication environments. Accordingly, any reference to a CDMA communications system is intended only to illustrate the inventive aspects, with the understanding that such inventive aspects have a wide range of applications.

Figure 1:
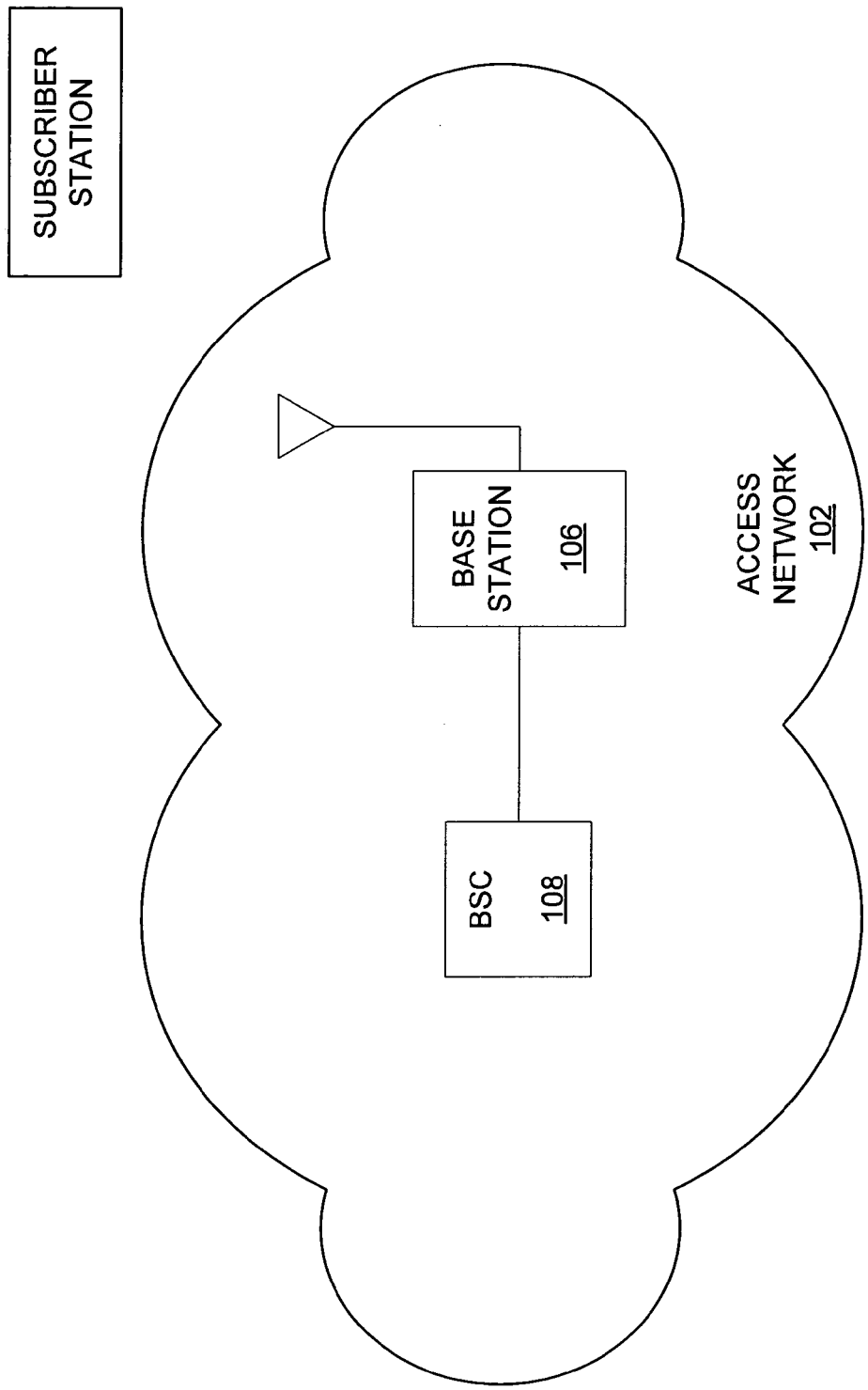
FIG. 1 is a conceptual block diagram of a CDMA communications system.

FIG. 1 is a conceptual block diagram of an embodiment of a CDMA communications system with overload detection capability. An access network 102 may be used to support communications between multiple wireless communication devices 104. The access network 102 may also be connected to additional networks outside the access network, such as the Internet, a corporate intranet, or a public switched telephone network (PSTN). The wireless communication devices 104, typically referred to as subscriber stations, may be any type of device that communicates with the access network 102 including a wireless or wireline phone, a computer, a modem, a personal digital assistant and the like. The access network 102 may be implemented with any number of base stations dispersed throughout a geographic region. The geographic region may be subdivided into smaller regions known as cells with a base station serving each cell. In high traffic applications, the cell may be further divided into sectors with a base station serving each sector. For simplicity, one base station 106 is shown serving an entire sector. A Base Station Controller (BSC) 108 may be used to coordinate the activities of multiple base stations, as well as provide an interface to the networks outside the access network.

The base station 106 transmits a pilot signal over the forward link to establish communications with subscriber stations traveling through the base station's sector. The forward link refers to transmissions from the base station 106 to a subscriber station 104, and a reverse link refers to transmissions from a subscriber station 104 to the base station 106. Initially, a subscriber station 104 may establish communications with the base station 106 by acquiring the forward link pilot signal. Once the subscriber station 104 acquires the pilot signal, it may access a forward link synchronization channel to acquire broadcast system information, and send a registration request to the base station 106 over the reverse link using an access channel. The base station 106 then forwards the registration request to the BSC 108 which registers the subscriber station 104. Once registered, the subscriber station 104 can receive data and control messages from the base station 106, and is able to transmit data and control messages to the base station 106.

A connection may be established by the subscriber station 104 by signaling the base station 106 over a reverse link access channel. Alternatively, the base station 106 may signal the subscriber station 104 over a paging channel to alert the subscriber station 104 to an incoming call. Either way, the base station 106 establishes a logical resource connection with the BSC 108 and assigns an address to the subscriber station 104 to identify communications intended for the subscriber station 104 over that connection. The address, typically referred to as a Medium Access Control (MAC) index, may be transmitted from the base station 106 to the subscriber station 104 with the exchange of signaling messages during call set up. A traffic channel may then be established between the base station 106 and the subscriber station 104 to support the data communications.

Techniques for increasing bandwidth are commonly employed to maximize user capacity. For example, the base station 106 may be implemented with a variable data rate scheme that transmits data at or near the maximum data rate which can be supported by the forward link. This may be achieved by measuring the quality of the Carrier-to-Interference ratio (C/I) of the forward link transmission at the subscriber station 104 and providing feedback to the base station 106 to control the forward link data rate. The C/I of the forward link transmission may be obtained by measuring the forward link pilot signal at the subscriber station by means well known in the art. Based on the C/I measurement, the subscriber station 104 may transmit to the base station 106 a Data Rate Control message (DRC message) on a reverse link data rate control channel (DRC channel). The DRC message may contain the requested data rate or, alternatively, an indication of the quality of the forward link channel, e.g., the C/I measurement itself. The base station 106 may use the DRC message from the subscriber station 104 to efficiently transmit the forward link data at the highest possible rate.

The reverse link data rate may also be controlled to improve bandwidth. This may be achieved by monitoring the stability of the receiver, and adjusting the reverse link date rate accordingly. A number of techniques may be used to monitor the stability of the receiver, including a direct measurement of the Rise-Over-Thermal (ROT) at the base station 106. The ROT is a measurement of the total received power over the level of the thermal noise power at the base station 106. When the reverse link is congested, the base station may attempt to maintain the ROT near a predefined limit, known as the ROT target, through a scheduling algorithm which often includes adjusting the reverse link data rate of each subscriber station 104. A Reverse Activity (RA) bit may be sent from the base station 106 to each subscriber station 104 to control the reverse link data rate. If the ROT exceeds the ROT target, the RA bit may be used by the subscriber station 104 to decrease the reverse link data rate. If the ROT is less than the ROT target, the RA bit may be used by the subscriber station 104 to increase reverse link data rate. The RA bit may be sent to each subscriber station 104 over a common forward link RA channel.

Power control techniques may also be employed to increase overall system capacity by reducing mutual interference between multiple subscribers. This may be achieved by limiting the reverse link transmission power to that necessary to achieve a desired Quality Of Service (QoS). The reverse link transmission power is typically controlled with two power control loops. The first power control loop is an open loop control. The open loop control is designed to control the reverse link transmission power as a function of path loss, the effect of base station loading, and environmentally induced phenomena such as fast fading and shadowing. This open loop estimation process is well known in the art.

The second power control loop is a closed loop control. The closed loop power control may be used to measure the signal strength of the reverse link transmission at the base station 106 and provide feedback to the subscriber station 104 to adjust the transmission power. The feedback may be generated at the base station 106 by comparing the measured signal strength of the reverse link transmission with a power control set point. If the measured signal strength of the reverse link transmission is below the power control set point, then the feedback provided to the subscriber station may be used to increase the reverse link power. If the measured signal strength of the reverse link transmission is above the power control set point, then the feedback provided to the subscriber station may be used to decrease the reverse link power. The feedback may take the form of a reverse link power control command (RPC), which may be transmitted from the base station 106 to the subscriber station 104 on a forward link RPC channel. The power control set point may be used to maintain the signal quality of the reverse link transmission at the base station 106. This may be achieved by dynamically adjusting the power control set point to maintain a target frame error rate (FER) for the reverse link transmission.

Figure 2:
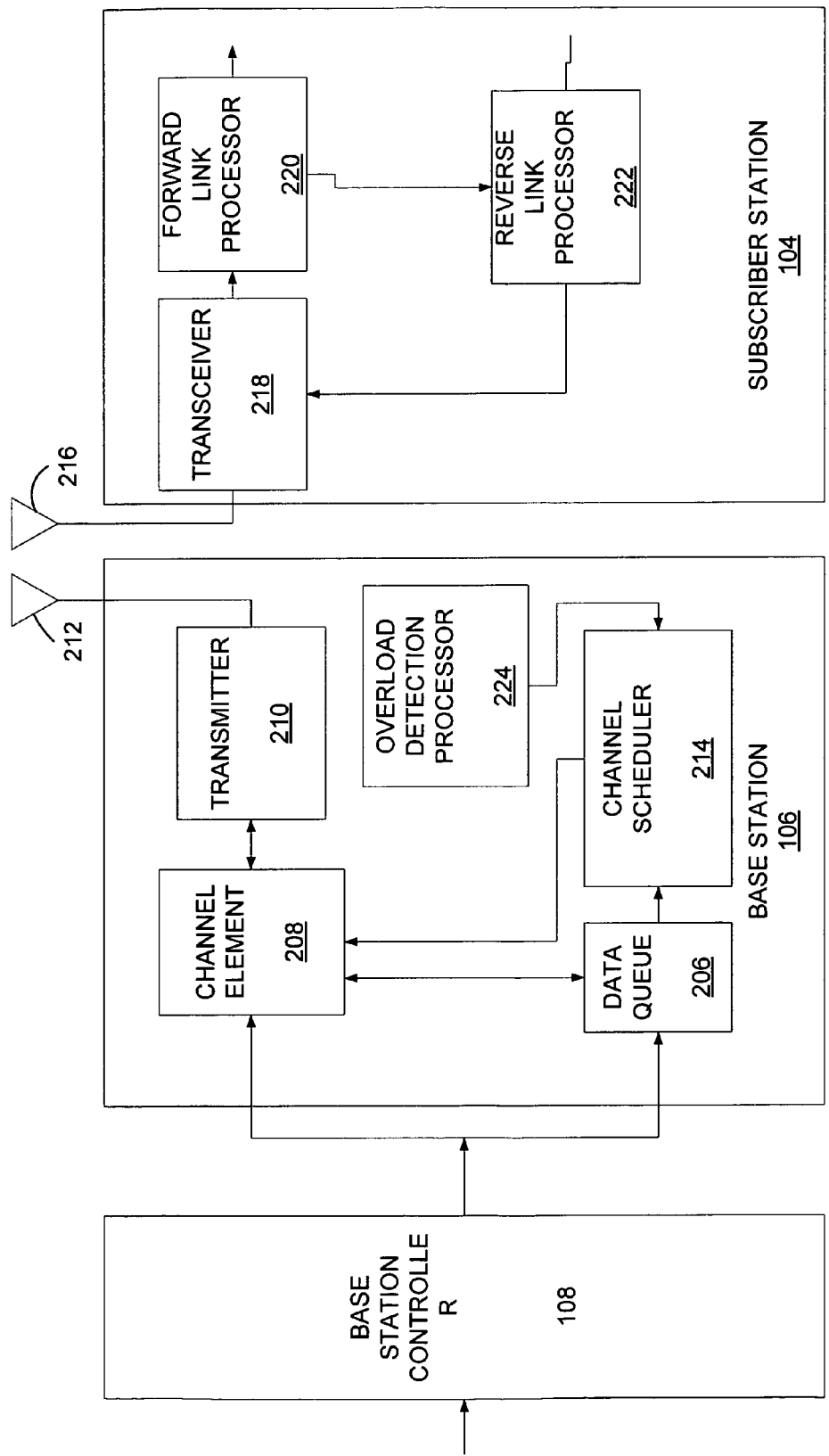
FIG. 2 is a functional block diagram illustrating the basic subsystems of a CDMA communications system.

FIG. 2 is a functional block diagram illustrating the basic subsystems of an access network 102. When a call is initiated either by the access network 102 or the subscriber station 104, a logical resource connection may be established between the BSC and the base station 106. The base station 106 may then assign a MAC index to identify communications intended for the subscriber station 104 over that connection. The assigned MAC index may be transmitted to the subscriber station 104 with the exchange of signaling messages during call set up.

Data from the access network may be routed to the BSC 108. The base station 106 maintains a data queue 206 which buffers the data from the BSC 108 before transmission to the subscriber station 104. The data from the queue 206 may be provided to a channel element 208. The channel element 208 partitions the data into packets, encodes the data packets using an iterative coding process, such as Turbo coding, interleaves the encoded symbols, scrambles the interleaved symbols using a long Pseudo-random Noise (PN) code, modulates the scrambled symbols using QPSK, 8-PSK, 16-QAM, or any other modulation scheme known in the art, and covers the modulated symbols with a distinct Walsh code. A pilot channel and a MAC channel may then be punctured into the data and the combination quadrature modulated short PN codes.

The MAC channel may be partitioned into multiple Walsh channels by the channel element 208, and BPSK modulated. The various Walsh channels may be used to support any number of sub-channels. For example, in at least one embodiment of the channel element 208, the MAC channel supports an RA channel common to all subscriber stations 104, and an RPC channel assigned to each subscriber station 104. The RA channel and each of the RPC channels are each covered with distinct Walsh codes from the available MAC channel Walsh codes and punctured into the data.

The channel element 208 provides the data including the pilot and MAC channel to a transceiver 210. The transceiver 210 filters and amplifies the data. The amplified data then modulates a carrier before being transmitted over the forward link through an antenna 212.

The system control and scheduling functions can be implemented in various ways such as with a channel scheduler 214. The location of the channel scheduler 214 is dependent on whether a centralized or distributed control/scheduling processing is desired. For example, for distributed processing, the channel scheduler 214 can be located within the base station 106. Conversely, for centralized processing, the channel scheduler 214 can be located within the BSC 108 and can be designed to coordinate the data transmissions for multiple base stations.

In at least one embodiment of the base station 106, the channel scheduler 214 coordinates the forward link data transmissions of the base station 106. The channel scheduler 214 connects to the data queue 206 and the channel element 208 within the base station 106 and receives the queue size, which is indicative of the amount of data to transmit to the subscriber station 104, and the DRC message from the subscriber station 104. In response, the channel scheduler 214 schedules the data rate for the forward link transmission to maximize data throughput and minimize transmission delay.

The forward link transmission is received by an antenna 216 at the subscriber station 104 and coupled to a transceiver 218 for filtering, amplification, and downconversion to a baseband signal. The baseband signal may be coupled to a forward link processor 220 where the data and MAC channel can be demodulated and decoded. The forward link processor 220 also computes the C/I from the pilot signal and generates a DRC message by means well known in the art. The DRC message may then be covered with a distinct Walsh code and punctured into reverse link data at a reverse link processor 222. The reverse link processor encodes, interleaves, modulates, and covers the data with a distinct Walsh code. The data may then be spread with the long PN code before being punctured with the DRC channel and quadrature modulated with the short PN codes.

The data from the reverse link processor 222 may be provided to the transceiver 218 for amplification and filtering. The data then modulates a carrier before being transmitted over the reverse link through the antenna 216.

Although various techniques have been described to increase the overall system capacity, problems may arise if too many subscriber stations 104 are attempting to communicate with the base station 106. A condition may be reached whereby the base station 106 simply cannot accommodate the number of remote stations attempting to access its resources. This condition is commonly referred to as overload. Examples of factors that contribute to overload include (i) receiver instability, (ii) forward link power allocation requirements exceeding the maximum power of the base station transmitter, (iii) the processing resources at the base station (or anywhere in the access network) becoming overtaxed and unable to handle the management of the subscriber stations, and (iv) the number of subscriber stations in communication with the base station becoming large enough to create a variety of problems such as possible capacity or bandwidth constraints.

The severity of the overload can also vary. As the overload increases, the base station 106 may be unable to meet the QoS requirements for all users. In more severe cases of overload, communication between one or more subscriber stations 104 and the base station 106 may be lost. In either case, overload can cause an undesirable degradation of performance that is noticeable to the user. For this reason, the base station 106 may be equipped with overload detection capability so that appropriate remedial procedures can be implemented, as necessary, to minimize or eliminate the adverse effects of overload.

The first factor that may contribute to an overload condition is a high ROT. As previously mentioned, an ROT measurement may be used to monitor the stability of the receiver. If the ROT is too high, the range of base station coverage (i.e., the distance over which the base station can communicate with subscriber stations) may be reduced and the receiver may become unstable. The range of the base station may be reduced because of an increase in the amount of reverse link transmission power required to achieve the target signal strength dictated by the power control set point. The base station 106 may be configured to detect an overload when the ROT exceeds the ROT target for a certain period or percentage or time as a preemptive measure before the receiver becomes unstable.

A second factor that may contribute to an overload condition is the maximum power capability of the base station transmitter. This overload condition may be monitored at the base station 106 through the RPC power algorithm. As discussed earlier, each subscriber station 104 in communication with the base station 106 receives an RPC on the forward link RPC channel to control the reverse link power. The RPC channel, in at least one embodiment, may be supported by the MAC channel. To effectively communicate the RPC to each subscriber station 104, each MAC channel should be allocated a certain amount of power, wherein the amount of power is sufficient for the subscriber station 104 to receive and decode the RPC. If the RPC is decoded incorrectly at the subscriber station 104, the subscriber station 104 may not transmit sufficient reverse link power to communicate with the base station. Alternatively, the subscriber station 104 may transmit at excessive power levels causing interference with other subscriber stations 104. In short, insufficient forward link transmit power on the MAC channel to support the various subscriber stations 104 may result in loss in reverse link capacity and/or degradation in individual user performance. In its most severe form, insufficient allocation of required MAC channel transmit power can result in network outages.

Loading on the processor resources of the base station may also lead to an overload condition. In many wireless communication systems, one or more processors in the base station 106, or a part of the BSC 108, or the access network 102 are responsible for managing the oversight and procedures associated with wireless communications between the base station 106 and the associated subscriber stations 104. Accordingly, processor limitations may in some cases trigger an overload, either alone or in combination with other factors.

Finally, the number of subscriber stations 104 in communication with the base station 106 may provide a loose indication of overload and may be a factor to be considered in some embodiments. The number of subscriber stations 104 communicating with the base station 106 may be determined by considering the number of allocated MAC indices. As will be discussed in greater detail later, however, while an increasing number of subscriber stations 104 in communication with the base station 106 places a progressively higher load on the base station 106, the number of subscriber stations 104 exceeding some static threshold does not necessarily indicate an overload. In some cases, an overload may occur prior to the number of subscriber stations 104 exceeding some predetermined maximum. In other cases, an overload causing communication degradation may not exist until the number of subscriber stations 104 is well over the threshold. However, inasmuch as the number of subscriber stations 104 in communication with the base station 106 does tax the base station 106 by contributing to receiver instability and additional power allocation requirements, among others, this factor is at least indirectly relevant to the issue of whether the base station 106 will become overloaded.

In at least one embodiment of the base station 106, the channel element 208 may include an overload detection function. In another embodiment of the base station 106, the overload detection function may be implemented in a module, circuit or algorithm separate from the channel element 208 and may reside in the base station 106, the BSC 108, or anywhere in the access network 102. The overload detection function can be embodied in software capable of being executed on a general purpose processor, a specific application processor, or in any other software execution environment. The general purpose processor or specific application processor may be dedicated to the overload detection function or may be shared with one or more functions performed by the base station, BSC and/or the access network. The software may reside in RAM memory, flash memory, ROM memory, EPROM memory, EEPROM memory, registers, a hard disk, a removable disk, a CD-ROM, or any other storage medium known in the art. Alternatively, the overload detection function can be embodied in hardware or in any combination of hardware and software. By way of example, the overload detection function can be implemented with an Application Specific Integrated Circuit (ASIC), a Field Programmable Gate Array (FPGA) or other programmable logic device, discrete gate or transistor logic, discrete hardware components, any combination thereof, or any other equivalent or nonequivalent structure designed to perform one or more of the described functions. For the purposes of clarity, the overload detection function is shown in FIG. 2 as an overload detection processor 204 because it is a distinct function that can be implemented alone or integrated with other functions for the purpose of sharing processing resources. It is to be understood that the overload detection processor 204 may embrace all possible implementations discussed above as well as embodiments that would be apparent to those skilled in the art.

The overload detection processor 204 may be configured to monitor one or more parameters depending on the particular communications application and the overall design constraints of the system. In at least one embodiment, the overload detection processor 204 monitors the following: (i) ROT, (ii) MAC channel power constraints, (iii) processing resources in the base station, and (iv) the number of subscriber stations supported by the base station. The overload detection processor 224 may also be configured to detect the severity of the overload, and overload control and remedial procedures. The remedial procedures may be designed to adapt to the following: (i) the severity or degree of the overload, (ii) the persistence of the overload—e.g., the continuous return of the specific overload triggers, and (iii) the type of overload. As an illustration of (iii), overload control procedures that might be deployed in the event that the ROT is excessively high may be different from the procedures that might be employed in a situation where the base station is unable to allocated sufficient power to the forward link MAC channels. The overload detection processor 204 may be further equipped with a mechanism for early detection of overload. Early overload detection is similar to monitoring various degrees of overload, with the exception that remedial procedures may take place prior to the occurrence of any official overload condition.

By distinguishing between different types and degrees of overload, the overload detection processor 204 can use a different remedial approach that is specific to or most suitable for the type of overload condition detected. The remedial procedure should minimize the degradation in performance of the communications system to cause the least amount of disturbance possible to a given user of a subscriber station. The remedial procedure may be a function of any of the following: (i) the type of application being run over the system (e.g., internet application, voice conversation, video on demand, FTP download, etc.), (ii) the overload trigger or type, (iii) the overload degree or severity, (iv) the persistence of the overload condition, and (v) the QoS rules. The QoS rules are a set of rules that relate to various applications and that assign different priorities to different actions, with the goal of achieving the best possible user experience under the circumstances.

The overload detection processor 204 may, if necessary under the circumstances, "bump" or release subscriber stations. It may be prudent in some circumstances to discern the identity of the user to be bumped. For example, a delay sensitive application may have transferred a significant amount of data but is nonetheless an inappropriate candidate for bumping. Bumping such a user may not only be unnecessary, but also will likely have a negative effect on performance that is highly noticeable to the user. A preferred approach under certain circumstances may be to bump a non-delay sensitive application, which can easily reconnect and recommence communications. Nonetheless, bumping even a delay-sensitive user may nevertheless be justified in certain circumstances. As an illustration, the user may still be bumped if the bumping activity results in a significant impact on increasing the quality of MAC power allocation. The multiple overload detection features allow overload control decisions to be dynamic and to differ to best suit the circumstances in hand.

Overload Based on ROT

As described herein, the base station 106 transmits a common RA bit to each subscriber station 104 indicating whether the ROT exceeds a target level. The RA bit may be used by the subscriber stations 104 to increase or decrease its reverse link data rate. It may also be used to determine whether an overload condition at the base station exists.

Each base station 106 may determine the value of the RA bit that it continually sends to all the subscriber stations 104 within its sector. A sector S may compute its load X as follows:

$$X = \sum_{K \in C(S)} (E_c)_k / I_0 = \sum_{k \in C(S)} ((E_{cp})_k / I_0)(TTP)_k \quad (1)$$

where C(S) is the set of all the subscriber stations in communication with the base station, $(E_c)_k$ is the total received energy per chip from subscriber station k, and $I_0$ is the total received power spectral density in the sector. The total received chip energy $(E_c)_k$ can be seen as a product of two terms: the Traffic-To-Pilot ratio $(TTP)_k$, and the pilot chip energy $(E_{cp})_k$. The $(TTP)_k$ is a function of the data rate. The base station then compares its ROT to a threshold ROT target T. If X>T, the base station sets the RA bit to 1. If X<T or if X=T, the base station sets the RA bit to 0. In legacy CDMA communication systems, means for computing the RA bit may already exist in the base station 106. In other embodiments of the base station 106, the RA computation may be performed by the overload detection processor 204.

ROT is a good candidate to include in any overload detection scheme, as the ROT target at the base station 106 may be exceeded with far fewer than the maximum allowable number of subscriber stations 104 physically located in the base station's sector. For example, subscriber stations in the same sector or in adjacent sectors transmitting at high data rates may contribute to interference at the base station 106 causing the ROT to rise—even if the number of subscriber stations 104 in the base station's sector is below the static threshold used for overload detection. The traditional method of overload detection—namely, considering the number of subscriber stations physically located in the sector—would not detect overload under these circumstances and no measures would take place to control overload. The likely result using the traditional scheme would be an eventual abrupt and highly noticeable failure of communications adversely affecting a potentially large group of users.

In at least one embodiment of the overload detection processor 204, the following overload detection criteria may be used when the ROT exceeds the target level. First, the fraction of time (over a predefined interval) for which the RA bit is set to 1 may be considered. When the RA bit is set to one for longer than a certain period X, then an overload may be declared. X may be dependent on the base station and is often discovered through trial and simulation. The frequency of this occurrence may be indicative of a potential overload problem, even if the RA bit does not remain at one for a time period which is considered to be an overload. Additionally, the length of time the RA bit is set to one may also be indicative of the severity of overload.

While not per se representing an overload condition, the monitoring of the ROT at the base station 106 (whether directly, through monitoring of the RA bit, or otherwise) may help prevent or reduce the impact of reverse link instability. Even where the ROT crosses the target for some nominal period $T_0 \ll X$ (X being considered overload), this phenomenon can be used as an early detection mechanism whereby appropriate management procedures may be employed to help avoid severe overload should the reverse link become unstable, or to help avoid overload altogether.

Figure 3:
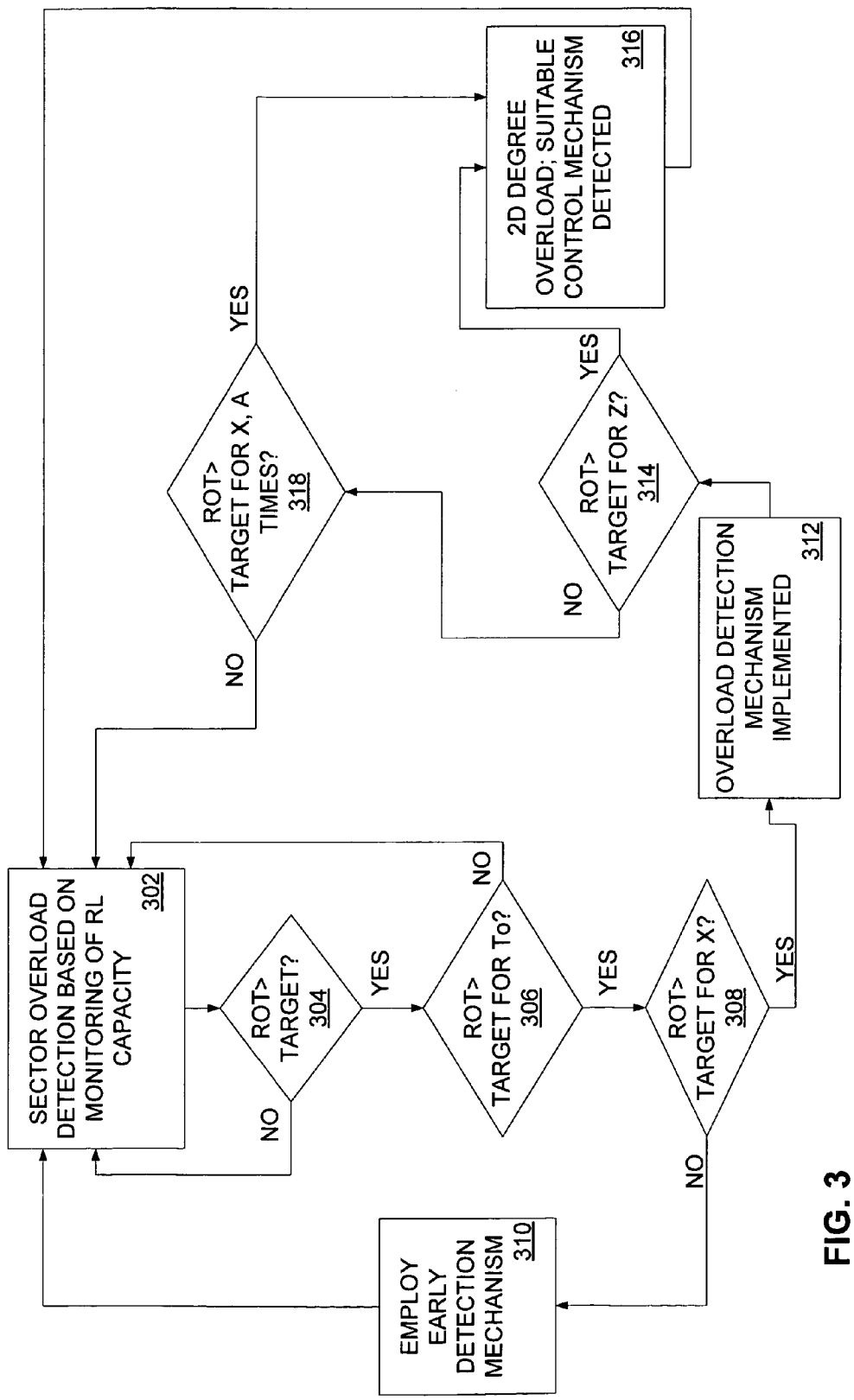
FIG. 3 is a flowchart illustrating a process for monitoring receiver stability.

FIG. 3 provides an illustration of the principles discussed above. FIG. 3 depicts a flowchart which illustrates an example of a overload detection scheme for excessive base station loading. FIG. 3 is but one of many possible implementations of the overload detection scheme for this parameter. The logic flow and remedial procedures of an alternative overload detection scheme may depend on other attributes such as, for example, relationships between the ROT, the base station transmission power limits, the processing resources needed to support the subscriber stations, and the number of subscriber stations supported by the base station. In other words, the overload detection scheme may not depend on just the results of monitoring the ROT alone, but may also depend on a combination of results of individual parameters. Further, the stability of the receiver may be monitored in a large variety of ways depending on the type of base station, the design parameters employed, etc. In any event, where the congestion of the reverse link is high and overload results, then appropriate remedial measures may need to be taken regardless of the state of the other parameters measured.

Referring to FIG. 3, the process of monitoring the ROT is commenced in step 302. In this embodiment, the overload detection processor considers whether the ROT value has achieved a ROT target value (i.e., when the RA bit=1) in step 304. If not, the monitoring process continues at step 302. If the ROT target has been achieved, the overload detection processor then determines whether the ROT has exceeded the ROT target for more than a period To in step 306. In this embodiment, To does not represent a large enough time period to indicate an overload; rather, it is selected as a period of time sufficient to warrant the initiation of appropriate procedures to reduce the possibility of an ensuing overload. If not, no overload is detected and the monitoring process continues at step 302.

If the overload detection processor determines that the ROT has exceeded the ROT target for more than a period of To, then the overload detection processor measures whether the ROT has exceeded the ROT target for a period X in step 308. X is a period of time determined through simulation, testing, or otherwise to be sufficient for a ROT to induce overload. X can represent a time period, or a fraction or percentage of time. The duration of X may be chosen, among other considerations, to provide the overload detection processor with some capability to be reactive, that is, to remedy the overload. X may be selected based on the parameters of a particular communications system.

If the ROT does not exceed the target ROT for a period X, then the overload detection processor may employ early detection overload control measures in step 310. The measures may vary widely, and may include bumping one or more idle users, etc. to reduce the probability of overload. In other embodiments of the overload detection processor, early detection procedures may not be implemented unless and until an overload condition is declared. Early detection can be considered a proactive procedure designed to thwart problems that accompany system overload. If the ROT has exceeded the target ROT for a period X, then an overload condition may be declared in step 312. Appropriate remedial procedures may then be implemented.

After remedial procedures have been implemented as necessary and appropriate in step 312, the operation of the base station should return to normal. Nevertheless, the overload detection processor may continue to monitor the ROT in step 314. If the ROT continues to exceed the target ROT, and the base station remains in an overload condition for a selected period Z ($Z>X>T_0$), then a second degree—or severe—overload may be declared in step 316. At that point, the overload detection processor may implement overload control procedures that may be more dramatic or noticeable to users in order to escape the overload condition and prevent far more drastic and noticeable consequences.

In addition or alternatively, the overload detection processor may also monitor the number of times that the ROT has exceeded the target ROT in step 318. This factor is indicative of, among other things, a persistent overload condition. If the number is large, then there may be a persistent overload condition which also may be characterized as a second degree overload in step 316 warranting more severe remedial procedures.

The proper overload control measures may vary widely. The variation is due to a large number of factors, the most important of which are the type and design of the wireless communication system. Other paramount factors relevant to the selection of overload control measures include the specific design parameters, the orientation, size and layout of the communications system, the reasons for the increased ROT, parameters other than a high ROT leading to or reducing overload, the severity of overload, etc. Optimal overload control measures may be implemented to minimize the impact on users, while at the same time minimizing the probability of overload.

An example of an overload control measure based on the ROT will now be described. First, idle (though not dormant) users may be bumped from their connections with the base station. Bumping idle users prior to these users going "dormant" may reduce the ROT. At the same time, this procedure is much less likely to be noticeable to users, let alone cause disastrous communication problems. As an example, a user on a subscriber station engaged in a data communication will probably not notice a temporary disconnect at one base station between data transmissions (especially since the disconnect will be solved either by recontinuation of service, service via another base station, or otherwise, well before the user ever notices that a glitch has even occurred). This first step of bumping idle users may be particularly appropriate as an early detection procedure in step 310, but may be implemented anywhere that is suitable for the base station. Once idle users are bumped, then existing users may utilize this reduction in ROT to transmit at higher data rates, or at least to maintain transmission at their existing data rates. This minimally intrusive step is more likely to be effective at resolving overload problems when it can be employed at an early stage.

In the event that bumping idle users is either an unavailable alternative or insufficient, the base station may bump high data rate users. These users are typically the most significant contributors to a high ROT. It should be noted that, by the very nature of the described embodiment of the overload detection processor, the early detection procedures may often obviate the necessity for more drastic measures. Nevertheless, in certain circumstances, bumping such users is likely to dramatically reduce the ROT to acceptable levels.

While the above discussion concerning bumping users to reduce the ROT is in the context of a single sector, high data rate users may also be significant contributors of interference to adjacent sectors and cells. Consequently, bumping high data rate users may also result in noticeable improvement to the ROT in adjacent sectors or cells.

Such a strategy of bumping high data rate users may result in perceptible user impact on performance. Accordingly, the overload control procedures may be modified by QoS rules, other base stations or application specific considerations.

Next, users that have transferred the most amount of data may be bumped as a remedial measure. This strategy is most appropriate in cases of severe overload. This strategy is also system and application specific. It is further subject to the existing QoS rules. As an illustration, releasing a user performing an FTP download may have less of a perceptible impact on user performance than releasing a video on demand user.

Overload control measures may not always require that users be bumped. Depending on the communications system and numerous factors, overload control strategies other than, or in addition to, releasing users may be appropriate. For example, certain types of communication systems enable the allocation of additional bandwidth if amenable to the circumstances. Additional overload control procedures may involve transferring subscriber stations to an available base station. Enabling additional receivers or other dynamic hardware changes in the base station itself may also be possible.

In short, the overload control measures may vary widely. However, the ability of the overload detection processor to distinguish between degrees of overload and to directly measure a parameter indicative of overload may significantly decrease the likelihood that the base station system would regularly require more intrusive overload control measures.

Figure 4:
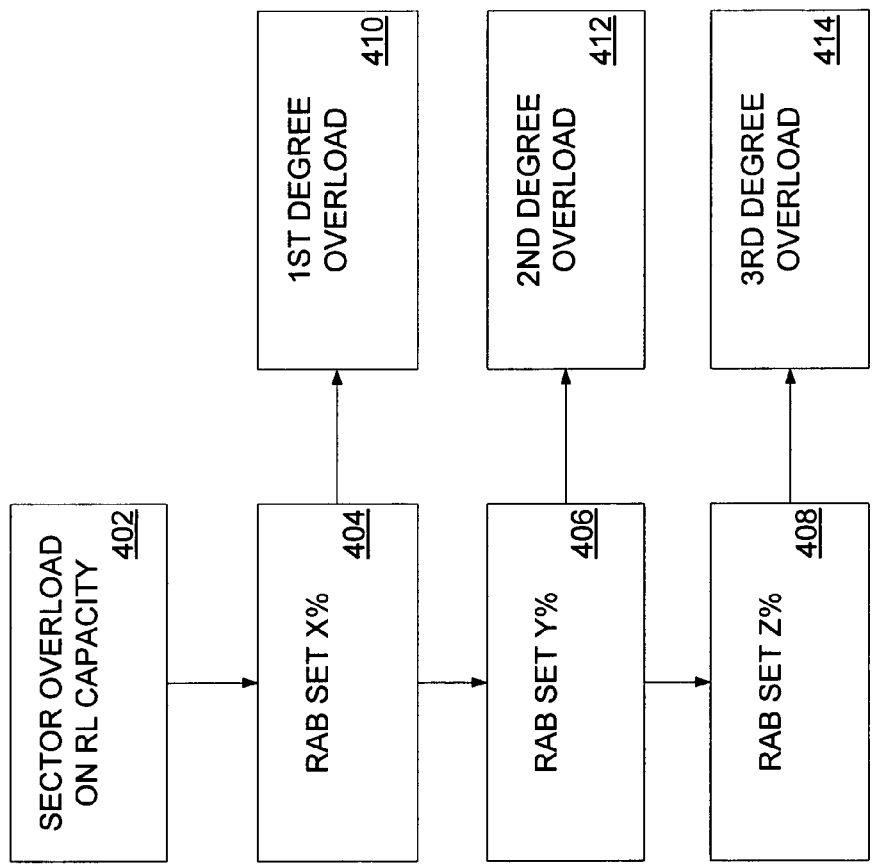
FIG. 4 is a flowchart illustrating an alternative process for monitoring receiver stability.

FIG. 4 is a flow diagram illustrating another approach, which may be implemented by the overload detection processor dealing with a high ROT. This approach may be used to monitor the ROT. In this embodiment, the overload detection processor may detect an overload by monitoring the percentage of time that the RA bit has been set. The process of monitoring the ROT is commenced in step 402. X, Y, and Z in steps 404, 406 and 408 each represent a certain percentage of a total allocated time. X, Y, and Z may be determined by simulation or other means known in the art, where X<Y<Z. The overload detection methodology illustrated in FIG. 4 is similar to that described in connection with of FIG. 3 in that it is designed to detect overload on the basis of how long the RA bit has been set.

If the overload detection processor determines that RA bit has been set to one for X% of the total allocated time, then a first degree overload condition may be declared in step 410. In response to a first degree overload, the base station may implement appropriate overload control measures to control the ROT, ideally clearing the RA bit and preventing a second degree overload condition. Alternatively, the value of X may be set lower as an early detection mechanism, enabling remedial measures with the same goal in mind. However, should the overload detection processor, after further monitoring of the RA bit, determine that the RA bit remains set for Y% of the total allocated time, then a second degree overload may be declared in step 412. Again, various overload control measures may be implemented to prevent a third degree overload.

The various overload control measures may be less intrusive than they might be otherwise in the presence of a catastrophic failure. However, should the overload detection processor, after continued monitoring, determine that RA bit has remained set for Z% of the total allocated time, then a third degree or most severe overload condition may be declared in step 414. In this case, the overload control module can immediately implement remedial measures most suitable for the severe overload condition resulting from excessive reverse link throughput.

In an alternative embodiment of the overload detection processor, the ROT may be monitored based on the number of consecutive update periods that the RA bit remains set to one (i.e., system operates higher than a predetermined RoT or stability threshold). This embodiment takes note of the fact that the forward link channel information may be updated periodically. In that case, X, Y and Z may each represent a number of update periods. These periods may be determined by simulation and/or other verification so that optimal values are achieved, and where X<Y<Z. In this embodiment, if the overload detection processor determines that the RA bit is set to one for more than X consecutive update periods, either an early detection state is declared or a first degree overload is declared. If the RA bit remains set to one for more than Y consecutive update periods (assuming X represented a first degree overload), then a second degree overload may be declared. If the RA bit remains set to one for more than Z consecutive update periods, then a third degree or severe overload may be declared.

Algorithm to Adjust the Target ROT

The ROT provides a convenient way to detect overload in legacy CDMA equipment because the ROT computational algorithm already exists. While the use of the ROT as an indicator of receiver stability is generally an accepted practice in the art, it should be understood that the ROT is only a rough estimate. This is because of the difficulty encountered in making real time estimates of the thermal noise in systems that need to support both voice and data. Often times, the thermal noise measurements are made during periods of low traffic (e.g., during the night) by shutting down all transmissions. This approach, however, may result in some inaccuracies because of changing environmental conditions, such as temperature and man-made noise. Moreover, even if a precise measurement of the ROT can be made, it is not always clear how to calibrate the target ROT. Generally speaking, the target ROT is determined through empirical analysis, and therefore, may lack a great degree of precision.

In at least one embodiment of the overload detection processor 204, an algorithm may be used to adjust the target ROT to compensate for measurement and calibration errors. The algorithm may be based on the reverse link power control commands, which may provide a more accurate indicator of receiver instability.

The algorithm may be implemented by first computing a metric $m_i$ for each of the subscriber stations in one-way soft handoff with the base station. The metric $m_i$ may be defined as follows:

$$m_i = \begin{cases} 1, & \text{for } PwrCmd = \text{Up}, SetPt < MaxSetPt \\ a, & \text{for } PwrCmd = \text{Up}, SetPt = MaxSetPt \\ 0, & \text{for } PwrCmd = \text{Down} \end{cases} \quad (2)$$

where $m_i$ is the metric for the $i^{th}$ subscriber station, PwrCmd is the RPC, SetPt is the power control set point, and a is a constant greater than 1. A metric M may be calculated as follows:

$$M = \frac{1}{N} \sum_{i=1}^{N} m_i \qquad (3)$$

where N is the number of subscriber stations in one-way soft handoff with the base station.

The computation of the metric M depends on whether the power control set point is at its maximum value. When the power control set point is at its maximum value, the metric M should be larger. The reason is that even if the reverse link is congested, in the steady state, the average number of power control up and down commands can still be equal. This is because in the overloaded system, the power control set point will be driven to its maximum value, and subscriber stations that have enough power to transmit at that level will fluctuate around that point (although with high FER), and those that do not have enough power will not transmit any data. Therefore, the metric M computation is modified in accordance with equation (2) in order to capture possible system problems due to reverse link congestion.

Once the metric M is computed, the target ROT may be updated as follows:

$ROT_{tgt} \to ROT_{tgt} - \delta_d$, if $M > Th_M$ or $FER > Th_{F1}$ (4)

$ROT_{tgt} \to ROT_{tgt} + \delta_u$, if $FER < Th_{F2}$ for a period of time, and the measured ROT does not exceed $ROT_{tgt}$ where M is the average metric, FER is the average frame error rate, $TH_M$ is the threshold for M, and $Th_{F1}$ and $Th_{F2}$ are thresholds for the FER.

An alternative algorithm may be used in communication systems that experience sudden changes in reverse link loading. This alternative algorithm may be used to compute a power control metric P in the following way. First, the metric M may be averaged over a time period Q. This may be computed as follows:

$$R_{q+Q-1} = \frac{1}{Q} \sum_{k=1}^{q+Q-1} M_k, \qquad (5)$$

where $M_k$ is the metric M computed from equation (3). Next, the power control metric P may be computed over a time period J in accordance with the following equation:

$$P_{j+J-1} = \frac{1}{J} \sum_{l=j}^{j+J-1} L_l, \qquad (6)$$

where $L_l$ is set depending on the $R_l$ in accordance with the following equation:

$$L_l = \begin{cases} 1, & \text{if } R_l \geq b \\ 0, & \text{otherwise} \end{cases}, \qquad (7)$$

where b is a constant.

Once the power control metric P is computed, the target ROT may be updated as follows:

$ROT_{tgt} \to ROT_{tgt} - \delta_d$, if $P > Th_P$ or $FER > Th_{F1}$ (8)

$ROT_{tgt} \to ROT_{tgt} + \delta_u$, if $FER < Th_{F2}$ for a period of time, and the measured ROT does not exceed $ROT_{tgt}$ where $TH_P$ is the threshold for the power control metric P.

Forward Link Power Allocation Requirements

Another parameter that may be monitored by the overload detection processor is the forward link power allocation requirements. In at least one embodiment of the overload detection processor, an overload may be declared when the power allocated to the various MAC channels exceed the total power limitations of the base station transmitter. The number of subscriber stations for which the base station can allocate sufficient power for the MAC channels varies widely. In large part, the number is a function of user distribution—namely, the position of the subscriber stations relative to the base station. The number may also be impacted by the data rate requested by the subscriber station via the DRC message, and whether the DRC message from the subscriber station can be decoded. It may also depend on the handoff state of the subscriber station, i.e., soft handoff or no handoff and the forward link serving sector. In a CDMA system, these factors all play into how much power the base station must make available in its forward link transmission to a subscriber station in its sector.

In one embodiment of the overload detection processor, the user distribution dictates the number of users that can be power controlled. Insufficient RPC power allocation by a base station to users that are being served may result in errors on the MAC channel, which may result in a loss of reverse link capacity. Notably, in this case, the reverse link throughput may decrease. Nevertheless, the increased power allocation requirements tax the base station in a manner, which produces the same result—reduction of communications, or loss of connections with, the subscriber stations.

A brief explanation of an RPC power allocation algorithm is presented here for background. First, the DRC message from each subscriber station may be used as an indication of the Signal-to-Interference and Noise Ratio (SINR) of the forward link. The forward link SINR for each subscriber station, as determined from the DRC messages, is used by the base station to determine the power allocation required at the base station to achieve a target RPC $E_b/N_0$. The required RPC power allocation for each of the subscriber stations is sorted in an increasing order of power requirements. Accordingly, a subscriber station that requires the least amount of forward link power would be allocated power first. Upon completion of the sorting process, the base station allocates power down the sorted list. Each subscriber station is allocated the requisite power dictated by its forward link SINR until (i) the process is complete and all subscriber stations are allocated the requisite power, or (ii) the requisite power for one of the remaining subscriber stations exceeds the available power after allocating the requisite power to subscriber stations with a lower power requirement. The latter contingency indicates an overload. Once the total available power is less than the requisite power for one of the remaining subscriber stations, all remaining subscriber stations are allocated an equal percentage of the remaining power.

Overload due to insufficient RPC power allocation is generally declared in multiple phases. The higher levels indicate a higher severity of overload. As in reverse link instability, an early detection of overload may be used by the overload detection processor to take measures to reduce the probability of severe overload.

Figure 5:
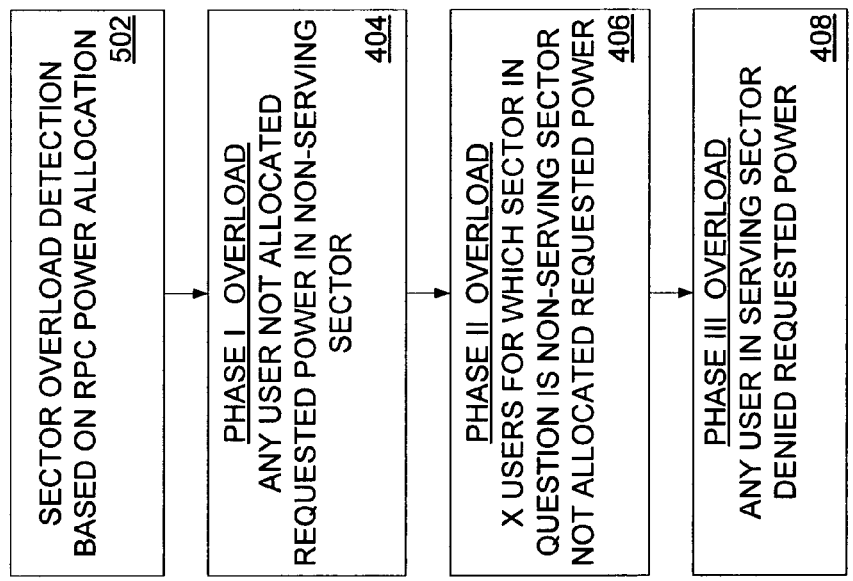
FIG. 5 is a flowchart illustrating a process for detecting forward link power allocation overload.

FIG. 5 is a flow diagram illustrating another approach, which may be implemented by the overload detection processor dealing with RPC power allocation. In at least one embodiment of the overload detection processor, three phases or degrees of overload may exist. As each phase is detected, an appropriate overload control measure may be implemented. In all three phases, an overload condition exists because the total power required to be allocated the MAC channels exceeds the total available power of the transmitter at the base station. In step 502, the overload detection processor commences the process of monitoring the RPC power allocations.

In step 504, the overload detection processor detects a condition where the requisite power for an RPC to a subscriber station in soft handoff at the outskirts of an adjacent sector served by another base station cannot be allocated, which results in an overload of the first degree. The detection of a first degree overload condition places the base station in condition for employing overload control measures if deemed appropriate.

In step 506, a certain number of RPCs to subscriber stations in soft handoff at the outskirts of sectors served by other base stations cannot be allocated their requisite power, which results in an overload of the second degree. X is a number that represents an optimal condition for detecting a second degree overload. X may be determined through simulations, testing and/or other means. X will vary depending on the implementation and the conditions that characterize the wireless communications system.

In step 508, a subscriber station operating in the base station's sector, which cannot be allocated sufficient power for its MAC channel results in the most severe overload, or an overload of the third degree. In this situation, the subscriber station may simply be cut off from communicating with the base station. This phase is the most severe, as it may simply result, at least as far as the user is concerned, in an incomprehensible and needless termination of a call. Nevertheless, the presence of an overload detection processor that ascertains this condition may be able to implement specific remedial procedures most appropriate for "damage control" given the specific circumstances.

The overload detection scheme described in connection with FIG. 5, and the separation of the overload conditions into phases, enables the system to (i) determine when an actual overload condition exists, as opposed to making an arbitrary assessment based solely on the number of remote stations, and (ii) separate the overload condition into degrees or phases, so that different remedial measures may be taken for different levels of severity of overload. Indeed, if certain remedial measures are taken after a phase I overload has been detected, then phases II or III may never even occur.

The overload control measures implemented based on insufficient power to support the MAC channels will vary depending on the implementation. However, typical measures taken to deal with overload are similar to measures implemented when the ROT is high. The least intrusive measure would be to bump or release users that are idle—namely, users that are not currently transferring data. A second measure may be to release users that require the maximum power allocation. Such users are ordinarily those users on subscriber stations at the edge of the base station's sector. These subscriber stations are generally engaged in soft handoff with another base station, and therefore, may not be greatly impacted if released. Alternatively, such users could be those subject to extremely poor channel conditions and hence require a significant amount of power on the MAC channel for an effective communication from the base station.

As with other overload control measures, the strategies in place for dealing with overload based on insufficient MAC channel power allocation may be modified depending on other considerations, such as the type of application being run on a particular subscriber station, the QoS rules, and other criteria.

Overload Detection Based on Insufficient Processing Resources

Overload may also occur in a base station due to the lack of processing resources. More specifically, the number and complexity of wireless connections between the base station and a set of subscriber stations require that a processor, such as a CPU, monitor and oversee the communications as well as handle dozens or hundreds of parameters associated with monitoring communications with the subscriber stations.

While a well designed communications system should contain sufficient processing power to manage conditions involving significant traffic, increasing bandwidth and unanticipated complexities in the wireless communications may conceivably render processing power a bottleneck. The processing limitations may exist in the interface between the base station and the fixed portion of the access network. The limitations may also exist in the base station itself. In sum, an overload situation occurs when a processor configured to perform functions relating to the effectuation and oversight of communications between the base station and the subscriber station set has insufficient resources to handle the load.

The processor at issue may well reside in the base station; alternatively it may reside in the BSC, or any portion of the access network. In some embodiments, a set of processors may be involved. An overload condition may be reached if the processor(s) lose sufficient resources to manage effective communications at any given time with the set of subscriber stations. Another example is where a processor cannot maintain the data transfer rates between the subscriber stations and the access network.

Further, it is possible that the overload detection processor may be implemented on a processor that is shared with other communication functions within the access network. In this case, the overload detection function may be prioritized in the event it is determined that processor resources may be marginal. Alternatively, the overload detection processor may be separate from the processor overseeing communication functions.

Figure 6:
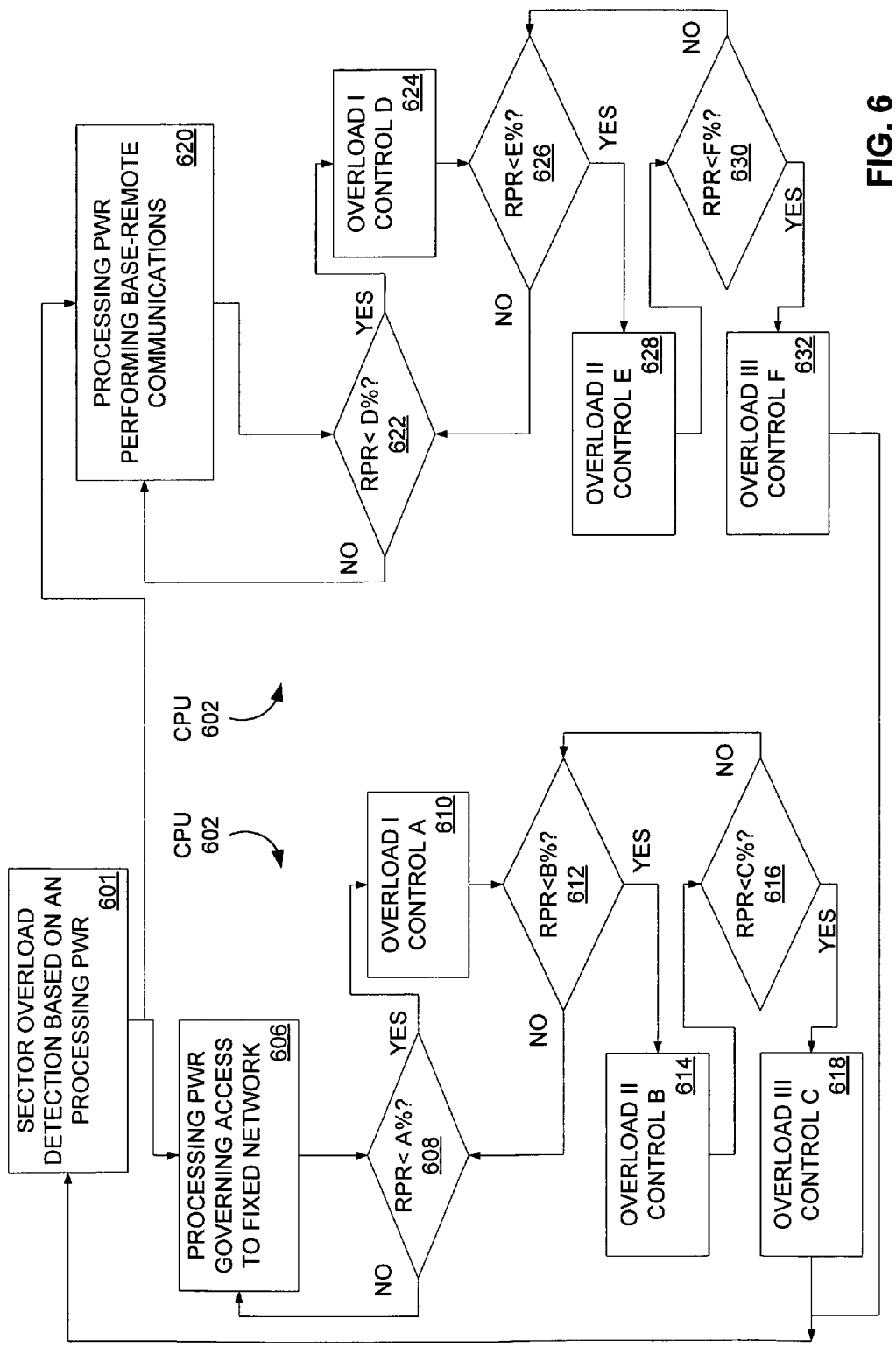
FIG. 6 is a flowchart illustrating a process for detecting when processing resources are overloaded.

FIG. 6 is a flow diagram illustrating another approach which may be implemented by the overload detection processor dealing with monitoring processing resources. It is assumed in this embodiment that a dedicated processor is used to perform the overload detection function. In this embodiment it is also assumed, as an illustration, that two central processing units (CPUs) are being monitored. One CPU 602 (not shown) regulates communications and the transfer of data between the base station and other components or stations within the access network. Another CPU 604 (not shown) regulates communications and the transfer of data between the base station and the subscriber stations.

In step 601, the process of monitoring processor resources is commenced. The parameters of the CPUs 602 and 604 measured by the overload detection processor are the "Remaining Processing Resources" (RPR), expressed as a percentage of total processing power. Referring to the flow diagram of the CPU 602 on the left of the figure, three threshold RPR percentages, A, B, and C, may be determined as optimal by simulation and/or testing, where A>B>C. In step 606, the CPU 602 governs the transfer of data between the base station and various components and/or stations within the access network. The overload detection processor measures in step 608 whether the RPR of the CPU 602 crosses A%. If not, the CPU 602 is functioning normally and control returns to step 606.

If the RPR falls below A%, the CPU 602 is being taxed by the communications between the base station and various components and/or stations within the access network. If appropriate, optional remedial procedures may be implemented in step 610 that in one embodiment do not include any "bumping" of users, but rather focuses on reallocation of processing resources and/or calls to adjacent processors for assistance with the load.

In step 612, the overload detection processor determines whether the RPR has fallen below B%. If not, the overload detection processor determines whether the CPU's RPR is more than A% in step 608, and if so, returns to a normal state in step 606. If, however, the B% threshold is crossed, the overload detection processor may implement optional procedures in step 614, which in this embodiment include initiating additional processor reprioritization processes, etc.

In step 616, the overload detection processor determines whether the RPR has fallen below C%. If not, the overload detection processor determines whether the CPU's RPR is more than B% in step 612, and more than A% in step 608, and if so, returns to a normal state in step 606. If, however, the C% threshold is crossed, severe overload may be declared by the overload detection processor and optional overload control procedures may be implemented in step 618. The overload control procedures may be implemented until CPU loading is in a normal state again, in which case the measurement of the same parameters begin again in step 606.

With respect to the CPU 604 regulating communications between the base station and the subscriber stations, the same process generally occurs, except that percentage values D, E and F (representative of chosen RPRs for the CPU 604) are used similarly to A, B and C. In step 620, the measurements for the RPR of the CPU 604 are made. Measurements are made as to whether the RPR for CPU 604 falls below D% (step 622) E% (step 626) and F% (step 630). As necessary, and depending on the severity of overload, overload control procedures may be implemented in steps 624, 628 and 632.

Number of Allocated MAC Indices

Overload may also occur when the number of subscriber stations in communication with the base station is too great. The number of subscriber stations in communication with the base station can be determined by the number of allocated MAC indices. Traditionally, the number of allocated MAC indices was the sole factor considered in assessing the existence of overload. As discussed at length, the mere consideration of the number of allocated MAC indices being equal to a static overload detection threshold is an inaccurate and unreliable method that produces misleading results. To the contrary, permitting yet additional simultaneous connected users will likely enhance the perceived user experience because more connections can be accommodated, the coverage area can be maximized, and total data rates can increase. The increase in user experience may be especially noteworthy on non-delay sensitive applications, such as data transfers or internet access, where the data rate can be high but the arrival of data at a specific time (such as that required for voice) need not be guaranteed (provided, of course, that performance is otherwise acceptable).

The addition of users is nonetheless subject to the qualification that the ROT level, RPC power allocation and dwindling processor resources do not suddenly become significantly more pronounced in the process. For a well-designed wireless communication system, it is highly unlikely that processor resources will compromise the integrity of communications. Further, in numerous situations, the number of users can well exceed a reasonably selected static threshold without the ROT or RPC allocation radically changing to thereby create significant performance problems. This is especially true if at least some percentage of the subscriber stations users are engaged in non-delay-sensitive applications.

However, because the number of users as a general matter does impact the criteria used to define overload conditions, it is useful in some embodiments to include this figure as a loose upper bound. The number of users, albeit not determinative, may in some cases be an adjunct to "complete a picture." For example, in a situation where the ROT and RPC power allocation, while not yet severe, are beginning to tax the base station, it may be more efficient in determining overload to include the number of users as a factor in construing a limit beyond which overload control procedures should commence.

An overload condition may be based on a number of factors. More specifically, overload may be present in a base station despite the absence of any single predominating factor. Rather, overload may result from a combination of non-dominating factors. The overload detection processor may be configured to identify combinations of factors leading to overload. In these embodiments, the overload detection processor may use sophisticated algorithms with proposed thresholds and remedial measures derived from combinations of applicable parameters leading to overload.

A flow chart illustrating an example of such an algorithm is shown in FIG. 7. For clarity, the degree of overload is omitted from this illustration. The principles of overload severity, however, equally apply in the context of combinational overload. It is also assumed, although not required, that the algorithm run within a processor in the base station.

In step 702, the overload detection processor monitors overload based on the type of overload as defined by those parameter(s) which contributed to the overload condition. Four parameters are considered in detecting an overload condition: (i) the ROT in step 704; (ii) the required RPC power allocations in step 706; (iii) the number of subscriber stations supported by the base station in step 708; (iv) and the available processing resources in step 710. The overload detection processor determines as an initial matter which parameters may be causing an overload. In one embodiment, nominal thresholds are used to determine whether the factors are loading the base station. As will be apparent to one skilled in the art, such a threshold determination can be accomplished using a variety of techniques.

The number of subscriber stations in communication with the base station can be determined in step 708 from the number of allocated MAC indices. The fact that a large number of users are present, if true, may indicate that parameters instead of or in addition to the other three factors are placing a load on the base station (depending on the status of the other parameters). In other situations, a large number of users may be present with no other signs of overload, indicating a favorable condition. In steps 704, 706, 708 and 710, the overload detection processor determines (i) if the system is in danger of or is likely in overload, and (ii) if so, which parameters are causing the overload condition.

In step 712, a more accurate depiction of the presence or absence of an overload may be determined based on thresholds relating to the various parameters. If it were determined that a potential overload condition exists based on a combination of parameters, then thresholds optimized for certain combinations may be supplied to the overload detection processor in step 716, if suitable. Using these thresholds, the overload detection processor may determine whether an overload is present.

Finally, in step 714, overload is declared, and appropriate remedial measures may be implemented. The remedial measure may be dependent on the type of overload. Alternatively, remedial measures determined to be most suitable to remedy overload conditions resulting from combinations of parameters may be made available in step 718.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a base station, or elsewhere in the access network. In the alternative, the processor and the storage medium may reside as discrete components in a base station, or elsewhere in an access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for communications, comprising:
   means for communicating, from a base station, with a plurality of communication devices, the communications placing a load on the base station;
   means for monitoring a plurality of parameters each relating to the load on the base station;
   means for detecting an overload as a result of one of the parameters crossing a threshold, the threshold being a target rise-over-thermal adjusted based on a metric that is a function of a plurality of power control commands for the communication devices; and
   means for implementing a plurality of control mechanisms to reduce the load on the base station, wherein the control mechanism used to reduce the load on the base station is selected based on a plurality of types and a degree of the overload on the base station; and wherein each type is associated with at least one of the parameters.

2. The apparatus of claim 1 wherein one of the parameters comprises receiver stability at the base station, and the overload is detected as a result of a receiver stability estimate exceeding the threshold for a period of time.

3. The apparatus of claim 2 wherein the receiver stability estimate comprises a rise-over-thermal.

4. The apparatus of claim 3 further comprising means for generating the power control commands for each of the communication devices, and adjusting the threshold as a function of the power control commands.

5. The apparatus of claim 4 further comprising means for monitoring the communications from each of the communication devices to detect errors, and wherein the adjustment of the threshold is further a function of the detected errors.

6. The apparatus of claim 1 wherein one of the parameters comprises transmission power requirements for a base station transmitter, the transmission power requirements being derived from feedback from the communication devices.

7. The apparatus of claim 6 wherein the transmission power requirements comprise transmission power requirements for a plurality of reverse power control (RPC) channels, each of the RPC channels being assigned to one of the communication devices.

8. The apparatus of claim 6 wherein the overload is detected as a result of the transmission power requirements exceeding a maximum transmission power capability of the base station transmitter.

9. The apparatus of claim 1 wherein one of the parameters comprises a number of the communication devices in communication with the base station.

10. The apparatus of claim 1 further comprising means for detecting a second degree overload as a result of said one of the parameters crossing a second threshold.

11. The apparatus of claim 1 wherein one of the parameters comprises loading on processing resources used for communication with the communication devices.

12. The apparatus of claim 1 wherein one of the parameters comprises receiver stability at the base station, base station transmission power requirements derived from feedback from the communication devices, or loading on processing resources used for communication with the communication devices.

13. The apparatus of claim 1 wherein one of the parameters comprises receiver stability at the base station, wherein a second one of the parameters comprises base station transmission power requirements derived from feedback from the communication devices, and wherein a third one of the parameters comprises loading on processing resources used for communication with the communication devices.

14. The apparatus of claim 13 wherein a fourth one of the parameters comprises a number of the communication devices in communication with the base station.

15. The apparatus as in claim 1, wherein one of the means for implementing a control mechanism comprises:
   means for determining idle users; and
   means for bumping service to idle users.

16. The apparatus of claim 1, further comprising:
   means for detecting an early time period, wherein the early time period occurs before the overload is detected; and
   wherein the plurality of control mechanisms are also implemented during the early time period.

17. The apparatus of claim 1, wherein means for detecting an overload as a result of one of the parameters crossing a threshold is for an entire period of time.

18. The apparatus of claim 1, wherein the plurality of types comprises a type indicating a high rise-over-thermal condition or a type indicating a lack of power.

19. An apparatus for communications, comprising:
means for communicating, from a base station, with a plurality of communication devices, the communications placing a load on the base station;
means for monitoring a plurality of parameters each relating to the load on the base station, wherein one of the parameters comprises receiver stability at the base station;
means for detecting an overload as a result of one of the parameters crossing a threshold, wherein the overload is detected as a result of a receiver stability estimate exceeding the threshold for a period of time, the threshold being a target rise-over-thermal adjusted based on a metric that is a function of a plurality of power control commands for the communication devices;
means for detecting a second degree overload as a result of the receiver stability estimate exceeding the threshold for a second period of time longer than a first period of time; and
means for implementing a plurality of control mechanism to reduce the load on the base station, wherein the control mechanism used to reduce the load on the base station is selected based on a plurality types and the degree of the overload on the base station; and wherein each type is associated with at least one of the parameters.

20. An apparatus for communications, comprising:
means for communicating, from a base station, with a plurality of communication devices, the communications placing a load on the base station;
means for monitoring a plurality of parameters each relating to the load on the base station;
means for detecting an overload as a result of one of the parameters crossing a threshold, the threshold being a target rise-over-thermal adjusted based on a metric that is a function of a plurality of power control commands for the communication devices;
means for detecting a second type of overload as a result of a second one of the parameters crossing a second threshold; and
means for implementing a plurality of control mechanisms to reduce the load on the base station, wherein the control mechanism used to reduce the load on the base station is selected based on the type and a degree of the overload on the base station; and wherein each type is associated with at least one of the parameters.

21. An apparatus for communications, comprising:
means for communicating, from a base station, with a plurality of communication devices, the communications placing a load on the base station;
means for monitoring a plurality of parameters each relating to the load on the base station;
means for detecting an overload as a result of one of the parameters crossing a threshold, the threshold being a target rise-over-thermal adjusted based on a metric that is a function of a plurality of power control commands for the communication devices; and
means for implementing a plurality of control mechanisms to reduce the load on the base station, wherein the control mechanism used to reduce the load on the base station is selected based on a plurality of types and a degree of the load on the base station, and wherein each type is associated with at least one of the parameters, the control mechanisms comprising:
means for determining idle users;
means for bumping service to idle users;
means for determining high data users; and
means for bumping service to high data users.

22. The apparatus as in claim 21, wherein the means for implementing a control mechanism further comprises:
means for determining a first group of users having transferred a first amount of data; and means for bumping service to the first group of users.

23. A base station configured to support communications with a plurality of communication devices, the communications placing a load on the base station, the base station comprising:
a processor configured to monitor a plurality of parameters each relating to the load on the base station, and to detect an overload as a result of one of the parameters crossing a threshold, and to reduce the load on the base station using a plurality of control mechanisms based on a plurality of types and a degree of the overload on the base station; and wherein each type is associated with at least one of the parameters, wherein the threshold is a target rise-over-thermal adjusted based on a metric that is a function of a plurality of power control commands for the communication devices.

24. The base station of claim 23 further comprising a receiver, and wherein one of the parameters is a function of receiver stability, the processor being further configured to detect the overload as a result of a receiver stability estimate exceeding the threshold for a period of time.

25. The base station of claim 24 wherein the processor is further configured to generate the power control commands for each of the communication devices, and adjust the threshold as a function of the power control commands.

26. The base station of claim 25 wherein the processor is further configured to monitor communications from the communication devices to detect errors, and wherein the adjustment of the threshold by the processor is further a function of the detected errors.

27. The base station of claim 23 further comprising a transmitter, and wherein one of the parameters is a function of transmission power requirements for the transmitter, the processor being further configured to derive the transmission power requirements from feedback from the communication devices.

28. The base station of claim 27 wherein the transmission power requirements comprises transmission power requirements for a plurality of reverse power control (RPC) channels, each of the RPC channels being assigned to one of the communication devices.

29. The base station of claim 27 wherein the processor is further configured to detect the overload as a result of the transmission power requirements exceeding a maximum transmission power capability of the transmitter.

30. The base station of claim 23 wherein the processor is further configured to detect a second degree overload as a result of the one of the parameters crossing a second threshold.

31. The base station of claim 23 wherein the processor is further configured to support communications with the communication devices, and wherein one of the parameters is a function of loading on the processor.

32. The base station of claim 23 further comprising a receiver and transmitter, and wherein the processor is further configured to support communications with the communication devices, and wherein one of the parameters is a function of receiver stability, transmission power requirements for the transmitter, or loading on the processor.

33. The base station of claim 23 further comprising a receiver and transmitter, and wherein the processor is further configured to support communications with the communication devices, and wherein one of the parameters is a function of receiver stability, a second one of the parameters is a function of transmission power requirements for the transmitter, and a third one of the parameters is a function of loading on the processor.

34. The base station of claim 33 wherein a fourth one of the parameters is a function of the number of communication devices in communication with the base station.

35. The base station of claim 23, the processor further configured to detect an early time period, wherein the early time period occurs before the overload is detected, wherein the plurality of control mechanisms are also implemented during the early time period.

36. The base station of claim 23, wherein the processor configured to detect an overload as a result of one of the parameters crossing a threshold is for an entire period of time.

37. The base station of claim 23, wherein the plurality of types comprises a type indicating a high rise-over-thermal condition or a type indicating a lack of power.

38. A base station configured to support communications with a plurality of communication devices, the communications placing a load on the base station, the base station comprising:
   a receiver; and
   a processor configured to monitor a plurality of parameters each relating to the load on the base station, wherein one of the parameters is a function of receiver stability, and to detect an overload as a result of one of the parameters crossing a threshold, the threshold being a target rise-over-thermal adjusted based on a metric that is a function of a plurality of power control commands for the communication devices, the processor being further configured to detect the overload as a result of a receiver stability estimate exceeding the threshold for a period of time, wherein the processor is further configured to detect a second degree overload as a result of the receiver capacity exceeding the threshold for a second period of time longer than the first period of time, wherein the processor is further configured to reduce the load on the base station using a plurality of control mechanisms based on a plurality types and a degree of the load on the base station; and wherein each type is associated with at least one of the parameters.

39. A base station configured to support communications with a plurality of communication devices, the communications placing a load on the base station, the base station comprising:
   a processor configured to monitor a plurality of parameters each relating to the load on the base station, and to detect an overload as a result of one of the parameters crossing a threshold, the threshold being a target rise-over-thermal adjusted based on a metric that is a function of a plurality of power control commands for the communication devices, wherein the processor is further configured to detect a second type overload as a result of a second one of the parameters crossing a second threshold wherein the processor is further configured to reduce the load on the base station using a plurality of control mechanisms based on the type and a degree of the load on the base station; and wherein each type is associated with at least one of the parameters.

40. A base station configured to support communications with a plurality of communication devices, the communications placing a load on the base station, the base station comprising:
   a processor configured to monitor a plurality of parameters each relating to the load on the base station, and to detect an overload as a result of one of the parameters crossing a threshold, the threshold being a target rise-over-thermal adjusted based on a metric that is a function of a plurality of power control commands for the communication devices, wherein the processor is further configured to reduce the load on the base station using a plurality of control mechanisms based on a plurality of types and a degree of the overload on the base station, and wherein each type is associated with at least one of the parameters; and
   a second processor configured to support communications with the communication devices, wherein one of the parameters is a function of loading on the second processor, wherein the second processor is further configured to reduce the load on the base station using a plurality of control mechanisms based on the type and degree of the overload on the base station.

41. A base station configured to support communications with a plurality of communication devices, the communications placing a load on the base station, the base station comprising:
   a processor configured to monitor a plurality of parameters each relating to the load on the base station, and to detect an overload as a result of one of the parameters crossing a threshold, and to reduce the load on the base station using a plurality of control mechanisms based on a plurality of types and a degree of the overload on the base station, and the type of application running on the base station, and wherein each type is associated with at least one of the parameters, wherein the threshold is a target rise-over-thermal adjusted based on a metric that is a function of a plurality of power control commands for the communication devices; and
   a receiver, transmitter, and second processor configured to support communications with the communication devices, wherein one of the parameters is a function of receiver stability, transmission power requirements for the transmitter, or loading on the second processor.

42. A base station configured to support communications with a plurality of communication devices, the communications placing a load on the base station, the base station comprising:
   a processor configured to monitor a plurality of parameters each relating to the load on the base station, and to detect an overload as a result of one of the parameters crossing a threshold, and to reduce the load on the base station using a plurality of control mechanisms based on a plurality of types and a degree of the overload on the base station, and wherein each type is associated with at least one of the parameters, wherein the threshold is a target rise-over-thermal adjusted based on a metric that is a function of a plurality of power control commands for the communication devices; and
   a receiver, transmitter, and second processor configured to support communications with the communication devices, wherein one of the parameters is a function of receiver stability, a second one of the parameters is a function of transmission power requirements for the transmitter, and a third one of the parameters is a function of loading on the second processor.

43. The base station of claim 42 wherein a fourth one of the parameters is a function of the number of communication devices in communication with the base station.

44. A method for communications, comprising:
communicating, from a base station, with a plurality of communication devices, the communications placing a load on the base station;
monitoring a plurality of parameters each relating to the load on the base station; detecting an overload as a result of one of the parameters crossing a threshold, the threshold being a target rise-over-thermal adjusted based on a metric that is a function of a plurality of power control commands for the communication devices; and
reducing the load on the base station using a plurality of control mechanisms based on a plurality of types and a degree of the overload on the base station, and wherein each type is associated with at least one of the parameters.

45. A computer-program product comprising a computer-readable medium having instructions thereon, the instructions comprising:
code for communicating, from a base station, with a plurality of communication devices, the communications placing a load on the base station;
code for monitoring a plurality of parameters each relating to the load on the base station;
code for detecting an overload as a result of one of the parameters crossing a threshold, the threshold being a target rise-over-thermal adjusted based on a metric that is a function of a plurality of power control commands for the communication devices;
code for detecting an early time period, wherein the early time period occurs before the overload is detected; and
code for reducing the load on the base station using a plurality of control mechanisms based on a plurality of types and a degree of the overload on the base station, and wherein each type is associated with at least one of the parameters.

* * * * *